(12) United States Patent
Hartley et al.

(10) Patent No.: US 11,843,685 B1
(45) Date of Patent: Dec. 12, 2023

(54) METHOD AND APPARATUS FOR EMBEDDED IN-VEHICLE DEVICE-TO-DEVICE CLOUD COMMUNICATIONS OPTIMIZATION

(71) Applicant: GM GLOBAL TECHNOLOGY OPERATIONS LLC, Detroit, MI (US)

(72) Inventors: Steven Hartley, Ponte-Claire (CA); Sherif Aly, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/973,748

(22) Filed: Oct. 26, 2022

(51) Int. Cl.
*G06F 15/16* (2006.01)
*H04L 69/22* (2022.01)
*H04L 67/12* (2022.01)

(52) U.S. Cl.
CPC .............. *H04L 69/22* (2013.01); *H04L 67/12* (2013.01)

(58) Field of Classification Search
CPC ................................ H04L 69/22; H04L 67/12
See application file for complete search history.

(56) References Cited

U.S. PATENT DOCUMENTS

2017/0221357 A1* 8/2017 Nathanson ........ G08G 1/096775
2022/0166857 A1* 5/2022 Fan ......................... H04L 69/22

* cited by examiner

Primary Examiner — Normin Abedin
(74) Attorney, Agent, or Firm — Quinn IP Law

(57) ABSTRACT

A vehicular communication controller includes a microcontroller (MCU) located within a vehicle to publish a newly defined protocol data unit (PDU) including a header and a payload portion to a destination device. The destination device may utilize a first protocol or a second protocol. If the destination device utilizes the first protocol that includes an automotive/embedded communication protocol then the MCU serializes the payload portion of the PDU and binds the PDU to the first protocol. The destination device may then receive the PDU using the first protocol, deserialize the payload portion, and remove the header leaving the payload portion unchanged and recreate, based on the deserialized payload portion, the PDU.

17 Claims, 8 Drawing Sheets

METHOD AND APPARATUS FOR EMBEDDED IN-VEHICLE DEVICE-TO-DEVICE CLOUD COMMUNICATIONS OPTIMIZATION

INTRODUCTION

Wireless communications are a ubiquitous part of everyday life. Mobile devices, such as smartphones may be used for communication, entertainment, navigation, internet access, and a myriad of other applications. Further, cloud communications are becoming increasingly popular as a cost effective and scalable third-party tool. Cloud communications may provide voice and data communications application and services hosted on servers where a user may only pay for the services or applications they use.

Vehicles are also rapidly integrating ever increasing technological components into their systems. Dedicated special use microcontrollers and technologies such as a system on a chip (SoC) may be used in many different applications in a vehicle. Automotive SoCs and microcontrollers may be utilized in enhancing automated structure that offer state-of-the-art experience to the customers, for example in tasks such as body control, camera vision, information display, security, autonomous controls, etc.

However, cloud-based transport protocols, including internet protocols are based on well-established standards that are not necessarily compatible with communications protocols utilized within a vehicle.

SUMMARY

Disclosed herein is a vehicular communication controller apparatus that includes a microcontroller (MCU) located within a vehicle. As disclosed herein, a cloud event that may also be referred to as a protocol data unit ("PDU"), e.g., CloudEvents™. The MCU may publish a newly defined PDU that includes a header and a payload portion. In addition, the MCU may determine that a destination device, or in another embodiment a receiving device, may utilize one of many protocols, referred to as a first protocol and a second protocol.

The MCU may determine that the receiving device utilizes the first protocol in which that first protocol includes an automotive/embedded communication protocol that supports remote procedure calls, event notifications and underlying serialization/wire format. Further, the MCU may serialize the payload portion of the PDU and binds, or writes, the PDU to the first protocol.

Further, the receiving device may receive the PDU using the first protocol and then deserialize the payload portion and remove the header leaving the payload portion unchanged. The receiving device, in an embodiment where the receiving device is not a destination device, may forward the PDU to a second device using the second protocol and leaving the PDU payload untouched.

Another aspect of the disclosure may include where the serializing the PDU into the payload portion.

Another aspect of the disclosure may include where the destination device may forward the PDU to a second destination device utilizing the second protocol.

Another aspect of the disclosure may include where the deserializing the payload portion uses a protobuf deserializer.

Another aspect of the disclosure may include where the destination device is located within the vehicle.

Another aspect of the disclosure may be where the destination device utilizes the second protocol and the PDU may be bound to a second protocol defined PDU without modifying the payload portion of the PDU.

Another aspect of the disclosure may be where the automotive/embedded communication protocol comprises scalable service-oriented middleware over IP.

Another aspect of the disclosure may be directed to a vehicular communication controller apparatus that may include a microcontroller (MCU) located within a vehicle. The MCU may receive a protocol data unit (PDU) published by a source device where the PDU may include a header and a payload portion. The MCU may also determine that the received PDU utilizes a first protocol or a second protocol. The MCU may also determine that the received PDU utilizes the first protocol, where the first protocol may include an automotive/embedded communication protocol that supports remote procedure calls, event notifications and underlying serialization/wire format. The MCU may also receive the PDU using the first protocol, deserialize the payload portion, and remove the header, but leaving the payload portion unchanged. The MCU may also recreate, based on the payload portion, the PDU.

Another aspect of the disclosure may include where the apparatus may include the deserializing the payload portion uses a protobuf deserializer.

Another aspect of the disclosure may be where the apparatus may include the source device being located within the vehicle.

Another aspect of the disclosure may include where the apparatus may include a destination device and where the MCU may forward the PDU to the destination device utilizing the second protocol.

Another aspect of the disclosure may be where the apparatus may include that the MCU is communicatively coupled through a cloud-based transport protocol.

Another aspect of the disclosure may include where the apparatus may include the MCU utilizing the second protocol and the PDU is added into a payload portion of a second protocol defined PDU without modifying the payload portion of the PDU and binds the second protocol defined PDU to the second protocol.

Another aspect of the disclosure may include where the apparatus may include the automotive/embedded communication protocol including scalable service-oriented middleware over IP.

Another aspect of the disclosure may include a method including generating, by a microcontroller (MCU), located within a vehicle, a protocol data unit (PDU), where the PDU may include a header and a payload portion. The method may also include serializing, by the MCU, the payload portion using a serializer. The method may also determine if a destination device utilizes a first protocol or a second protocol, where if the destination device utilizes the first protocol, the MCU may serialize the payload portion and bind the PDU to the first protocol. Further, if the MCU may determine that the destination device utilizes the second protocol the PDU is added into a payload portion of a second protocol defined PDU without modifying the payload portion of the original PDU and binds the second protocol defined PDU to the second protocol. The method may also include sending, by the MCU, the bound PDU, to the destination device. The method may conclude by deserializing, at the destination device, the payload portion of the PDU, wherein the header is removed and the PDU is recreated.

Another aspect of the disclosure may include where the method also includes serializing the payload portion uses a protobuf serializer.

Another aspect of the disclosure may include where the method also includes deserializing the payload portion uses a protobuf deserializer.

Another aspect of the disclosure may include where the method also includes where the first protocol includes scalable service-oriented middleware over IP.

Another aspect of the disclosure may include where the method includes a cloud-based transport protocol.

Another aspect of the disclosure may include where the method also includes that the destination device may be located within the vehicle.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
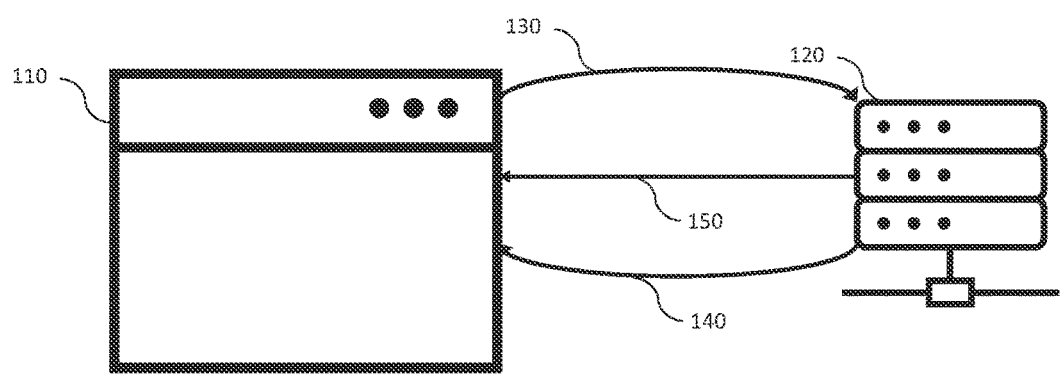
FIG. 1 is an illustration of a request/response web browser/server interaction, in accordance with the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
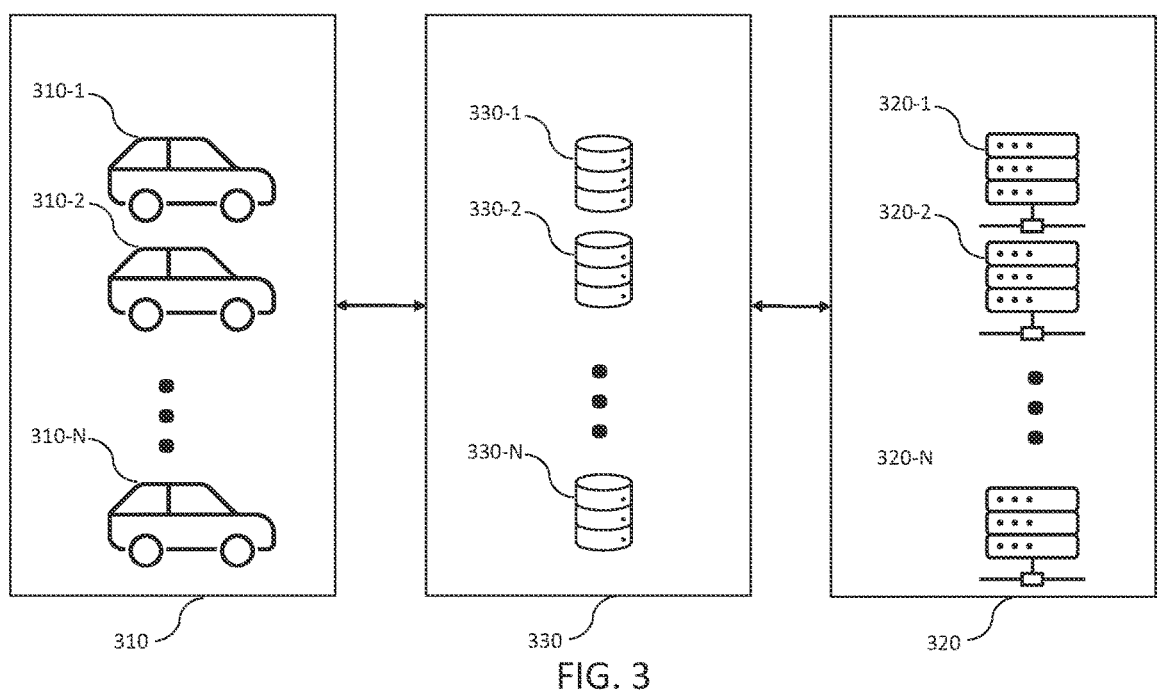
FIG. 3 is an illustration of a cluster publish/subscribe cloud interaction in accordance with the disclosure.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Disclosed herein is a vehicular communication controller apparatus that includes a microcontroller (MCU) located within a vehicle. A MCU within a vehicle is typically optimized to perform a particular function very efficiently. Further, a vehicle may contain multiple MCUs, each dedicated to a specialized function, but that are configured to communicate with each other. In the interest of efficiency, the communication protocols used within a vehicle may not be compatible with internet or cloud protocol standards. Such communication between devices, also referred to as D2D (device-to-device), have prompted various vehicle manufacturers to develop their own communications protocols. Further complications arise if a vehicle needs to communicate with an outside source, such as in the use of autonomous vehicles.

Sometimes referred to as Car-2-X applications, these applications require interaction between vehicles and off-board systems. In such situations, an automotive system may need to provide secure on-board communication in addition to support of internet or cloud-based services. In addition, cloud-based services may require dedicated controls for security, such as secure cloud interaction and emergency vehicle preemption along with the ability to support remote and distributed services, such as remote diagnostics, over the air update, repair, and exchange handling.

AUTOSAR™ (AUTomotive Open System Architecture) is a worldwide development partnership of vehicle manufacturers, suppliers, service providers and companies from the automotive electronics, semiconductor and software industry that is attempting to define standards for modularity, configurability, feasibility, producibility, and standardized interfaces.

AUTOSAR™ has proposed an automotive middleware solution that may be used for control messages, referred to as Scalable service-Oriented MiddlewarE over IP (SOME/IP). Unfortunately, the current SOME/IP solution, while directed to compatibility of functionality within the automotive industry, it is not compatible with current Cloud computing protocols.

In a representative use case, a vehicle may have multiple electronic devices controlling a wide variety of functions, for example, driving control systems, entertainment and infotainment systems, environmental controls, etc. Many of these functions depend on communications between other functional modules within the vehicle and outside of the vehicle. For example, a vehicle may use a radar or LiDAR system to detect objects around the vehicle, but may also receive cloud communications concerning an approaching emergency vehicle or the time an upcoming stop light will turn red. In other words, embedded D2D vehicular systems rely on communications within the vehicle and with outside sources to perform their designed functions. However, as will be discussed in the following figures, internet communication protocols, cloud communication protocols, and automotive/embedded communications protocols are not necessarily compatible.

FIG. 1 illustrates an example internet web session 100 of transporting data using an http protocol between a server and a web browser, according to an embodiment of the present disclosure. Web session 100 includes a web browser 110 and a server 120. The web session 100 starts with a request 130 for the web browser 110 to the server 120, where the request specifies the desired action, for example the delivery of a file, such as a video. Server 120 may then send the requested data 150, which for example may be a streaming video file. In addition, server 120 sends a response 140 to the client, for example the web browser 110, that the action it requested has been carried out. In another example, the response 140 may also be to inform the client that an error occurred in processing its request.

Figure 2:
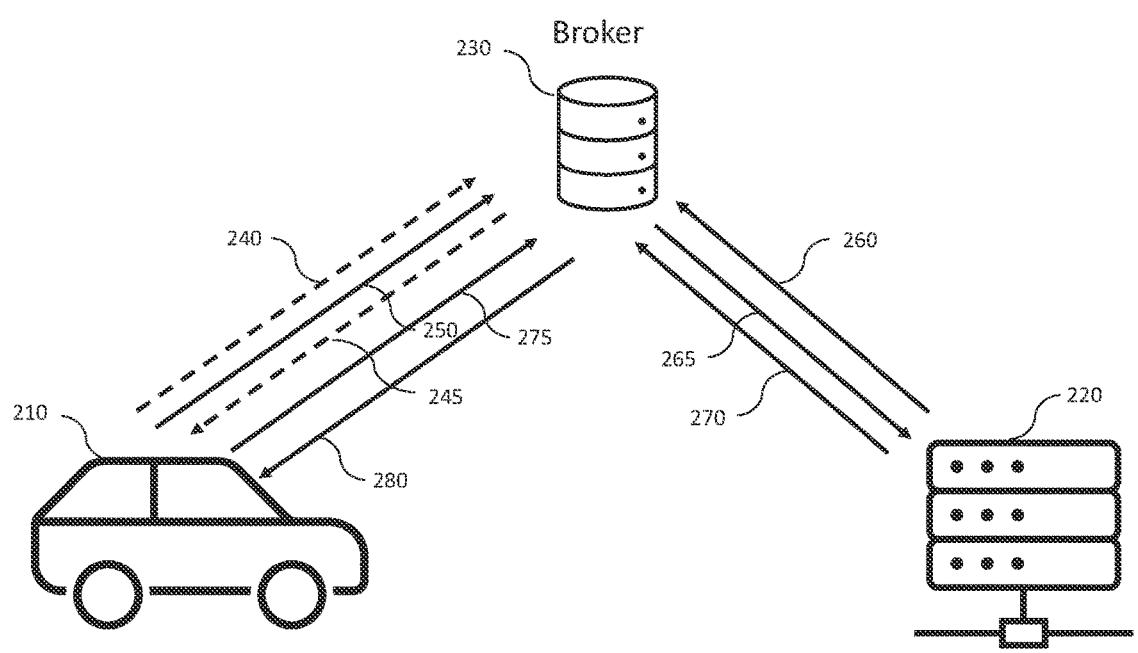
FIG. 2 is an illustration of a publish/subscribe cloud interaction in accordance with the disclosure.

FIG. 2 illustrates a cloud-based publish/subscribe system 200, according to an embodiment of the present disclosure. The cloud-based publish/subscribe system 200 does not utilize the request/response algorithm as described in FIG. 1. Rather, the publish/subscribe system 200 utilizes clients and brokers. For example, publish/subscribe system 200 may include a vehicle cloud client 210, a server cloud client 220, and a broker 230. As an example, the vehicle cloud client may contain sensors and controllers, also referred to as a vehicular communication controller (not shown) that may sense and control the speed of the vehicle. In this example vehicle cloud client 210 intends to send data, e.g., the speed of the vehicle to a recipient, for example the server cloud client 220. However, in the cloud-based publish/subscribe system 200 there is no direct contact between clients, i.e., vehicle cloud client 210 and server cloud client 220, but rather communications are routed through broker 230. The process may be initiated where vehicle cloud client 210 issues a connect message 240 to broker 230. If a connection between vehicle cloud client 210 and broker 230 is possible, broker 230 issues a connect message 245 back to vehicle cloud client 210 to acknowledge and establish a connection. Once the connection is established, vehicle cloud client 210 may then be determined to be a publisher and may send its payload data, such as its speed, to broker 230 shown as publish speed 250, along with other metadata identifying vehicle cloud client 210 as the source.

Once the published speed 250 message is received by the broker 230, which will check to see if there are subscribers for the topic name "speed" exist. In the example, server cloud client 220 is a subscriber 260 for the topic "speed." Therefore, a message with the topic of "speed" received by the broker 230 is sent or published to a subscriber that has subscribed to the "speed" topic. Thus, the speed data of the vehicle cloud client 210 is published as a speed message 265 to server cloud client 220. Server cloud client 220 may also concurrently act as a publisher. For example, given the speed message of the vehicle cloud client, the server cloud client may desire to publish a brake message to slow down the vehicle cloud client. In that example, server cloud client would publish a brake message 270 to broker 230. Vehicle cloud client 210 may be a subscriber for a brake topic 275, in which case vehicle cloud client would receive the published brake message 280 to automatically apply the brakes to slow the vehicle.

FIG. 3 illustrates a large cloud-based publish/subscribe system 300, according to an embodiment of the present disclosure. The cloud-based publish/subscribe system 300 includes vehicle cloud clients 310, shown as vehicle cloud clients 310-1, 310-2, through to 310-N, and server cloud clients 320, shown as server cloud client 320-1, 320-2, through to 320-N. In addition, the cloud-based publish/subscribe system 300 includes brokers 330, shown as broker 330-1, 330-2, through to 330-N. In an embodiment, vehicle cloud clients 310 are decoupled from server cloud client 320 and communicate through broker 330. Thus, communications between clients may be very stable, reliable, and scalable as there is no requirement for direct connections between the clients.

Figure 4:
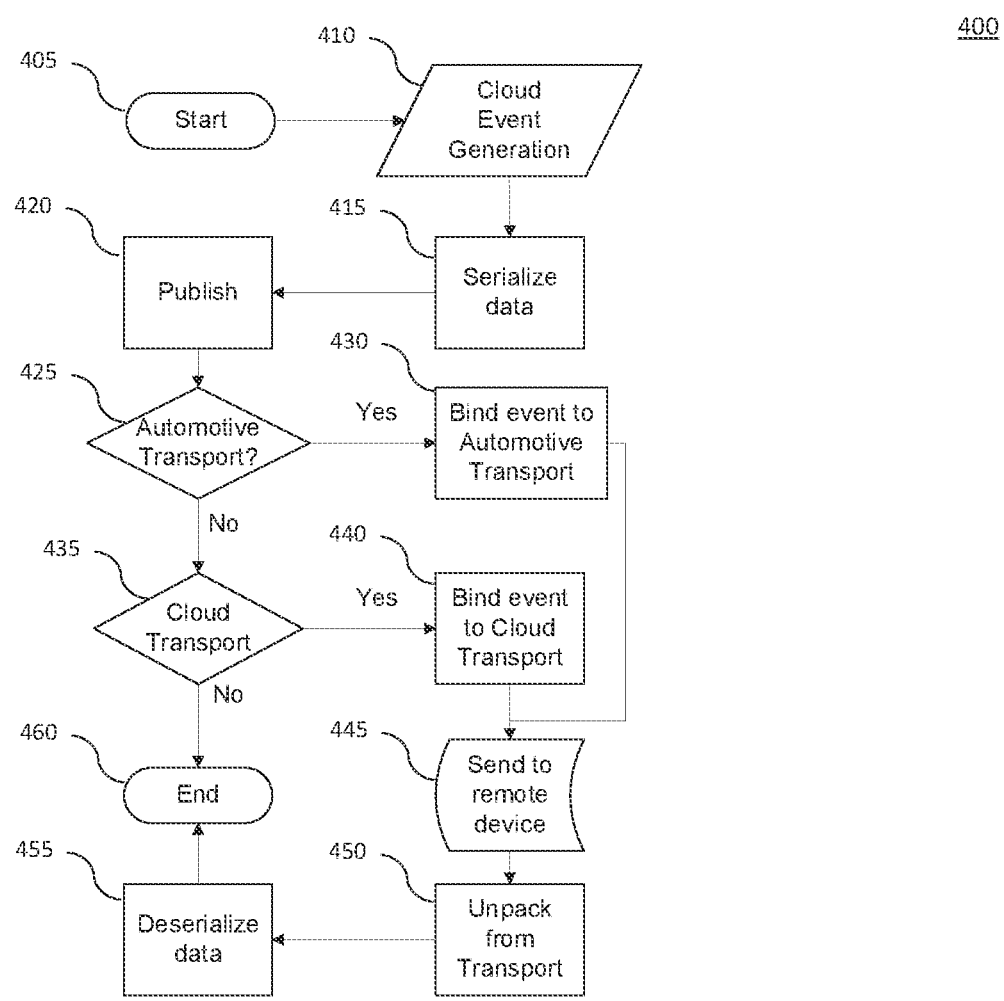
FIG. 4 depicts a flowchart of an embedded in-vehicle device-to-device cloud communications optimization, in accordance with the disclosure.

FIG. 4 is a flowchart of an embedded in-vehicle device-to-device cloud communications optimization system 400, according to an embodiment of the disclosure. Starting at step 405, the decision is made at step 410 to generate a cloud event, i.e., a protocol data unit (PDU). Given the example discussed in FIG. 3, the cloud event may be a speed of a vehicle. Also, as discussed in FIG. 3, a cloud event may also include additional structural metadata including identifiers and therefore the structured data needs to be serialized for transmission, or publication, which is accomplished in step 415. At step 420 the actual serialized cloud event data is published. At step 425 a determination is made as to whether the transport protocol type of the cloud event message is of the automotive transport type. An automotive transport type may include an automotive/embedded communication protocol that support remote procedure calls, event notifications and underlying serialization/wire formatting, for example a SOME/IP protocol.

If the transport type is determined to not be of the automotive type, then a further determination may be made at step 435 as to whether the transport type is a cloud-based variety, for example MQTT or CloudEvents™. CloudEvents™ is a specification for describing event data in common format to provide interoperability across, services, platforms, and systems.

Figure 5:
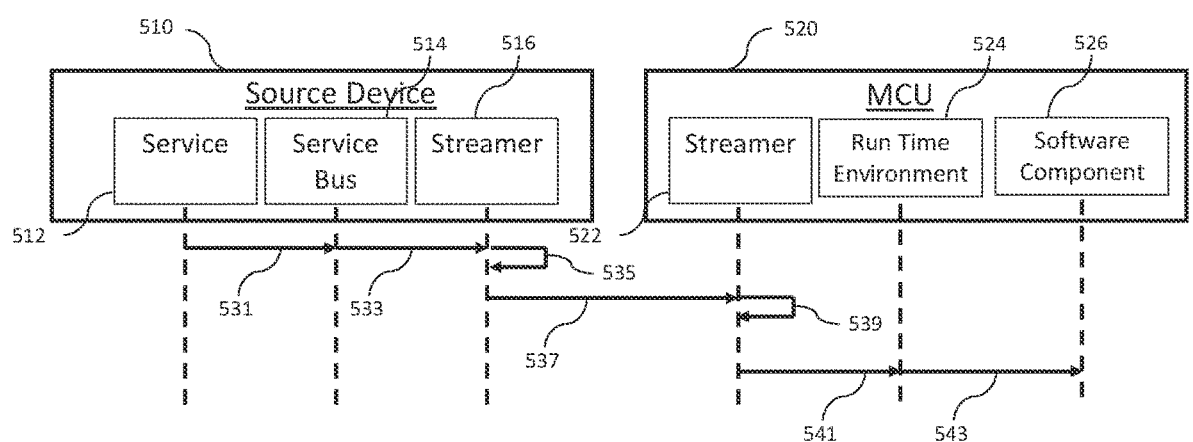
FIG. 5 is an illustration of a cloud to microcontroller optimization interaction, in accordance with the disclosure.
Figure 6:
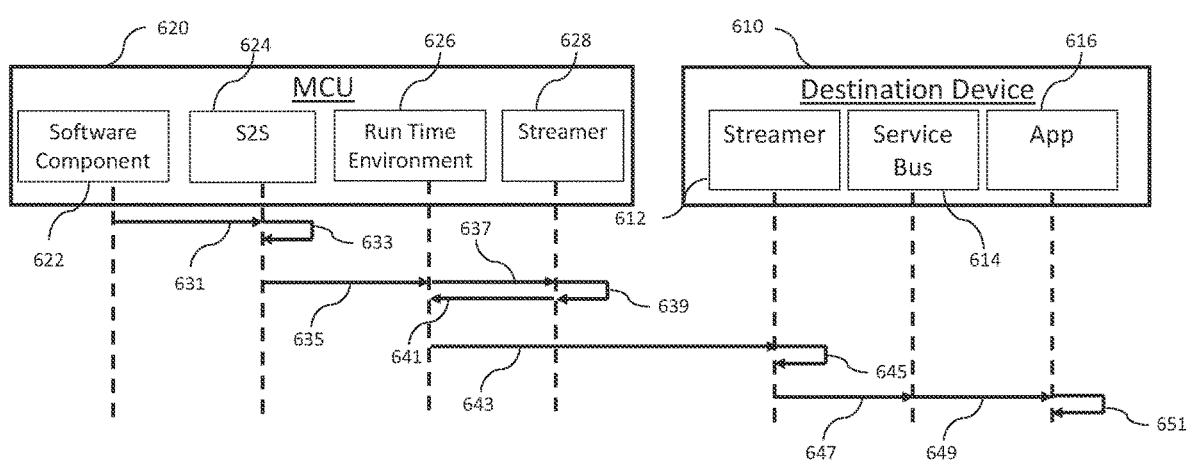
FIG. 6 is an illustration of a microcontroller to cloud optimization interaction, in accordance with the disclosure.
Figure 7:
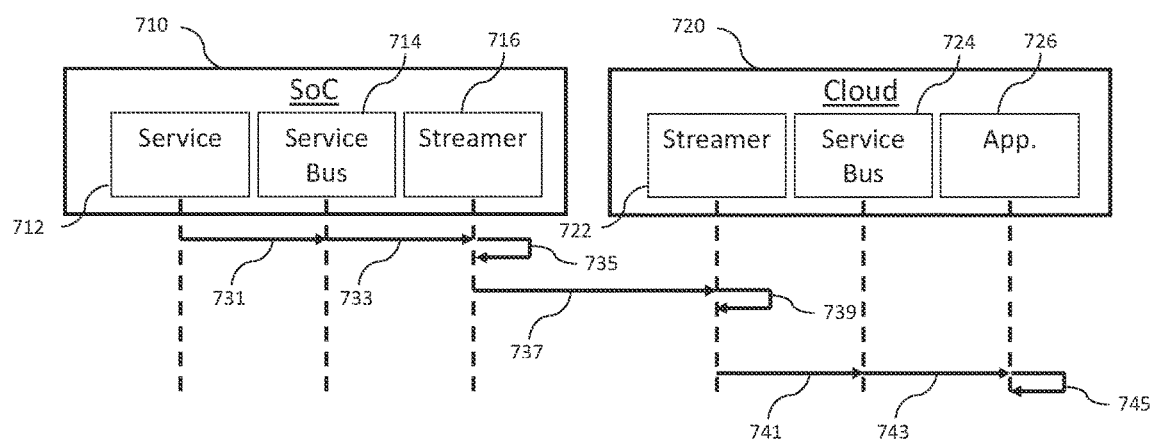
FIG. 7 is an illustration of a system on chip to cloud optimization interaction, in accordance with the disclosure.

If the transport type is determined to be of the automotive transport type, then at step 430 the cloud event is bound to the automotive transport as will be shown in greater detail in FIGS. 5, 6, and 7. If the transport type is determined to be of the cloud-based transport type, then at step 440 the cloud event is simply bound to the cloud-based transport protocol.

At step 445 the message is then sent to a remote, or destination device and at step 450 the cloud event data, i.e., a payload portion of the cloud event, is unpacked from the transport protocol and deserialized at step 455. The process then ends at step 460.

FIG. 5 is an illustration of a publishing event 500 from the cloud to a MCU according to an embodiment of the disclosure. Publishing event 500 includes a cloud-native technology 510 and an MCU 520 in which cloud events may be sent to and from embedded microcontrollers. Microcontrollers in the automotive industry and context may also be referred to in the context of mechatronics, which may also be described as a multidisciplinary field that refers to the skill sets needed in the contemporary, advanced automated manufacturing industry combining mechanics, electronics, and computing. Mechatronics may deal with robotics, control systems, and electro-mechanical systems.

Cloud-native technology 510, in an embodiment, may also be implemented as a system on chip (SoC). Further, cloud-native technology 510 may include service 512, also referred to as a cloud service, which may provide a wide range of services delivered on demand to companies and customers over the internet. Cloud-native technology 510 may also include a service bus 514 and a streamer 516. Service bus 514 may be a communications or messaging service on a cloud used to connect applications, devices, and services running in the cloud to other applications or services. In essence, service bus 514 acts as a communications and messaging backbone for applications available in the cloud or across devices.

MCU 520 may include a streamer 522, a run time environment 524, and a software component 526. Streamer 516 and streamer 522 may be considered to be a device-to-device bridge from the cloud world to the embedded automotive world. Run time environment 524 may act as a communications bridge between the streamer 522 and software component 526.

Publishing event 500 may include the following sequence. Service 512 generates a cloud event 531 wherein the metadata is populated and the payload data may be generic and is sent on to the service bus 514 where the cloud event 531 is serialized, for example using a protobuf serializer, as a cloud event message 533 and then sent to the streamer 516 that may perform a protocol binding where the cloud event message 533 is integrated into an automotive/embedded communication protocol, for example SOME/IP, at protocol binding 535. The bound message is then serialized and sent as message 537 to streamer 522, for example as a cloud event over SOME/IP or MQTT.

Streamer 522 receives message 537 and at step 539 deserializes the cloud event header by stripping information such as the transport header. Streamer 522 then may build a cloud event object 541 using metadata from the message transport and payload and sent to the run time environment 524 that may then de-serialize the cloud event object 541 using a deserializer such as protobuf and deliver the cloud event 543 to the software component 526.

FIG. 6 is an illustration of a newly defined publishing event 600 from a MCU to the cloud according to an embodiment of the disclosure. Publishing event 600 includes a MCU 620 and a cloud native technology 610 in which events may be sent to and from embedded microcontrollers to the cloud. MCU 620 may also include a software component 622, a software component referred to as software-to-software 624 that provides translation and abstraction. MCU 620 may also include a run time environment 626 and a streamer 628. Cloud native technology 610 may include a streamer 612, a service bus 614, and a software application 616.

Publishing event 600 may include the following sequence. Software component 622 may generate one or more signals 631 that represent a threshold, trigger, operation, or other type of event. Signal 631 may then be passed to software-to-software 624 that may provide translation and abstraction at step 633 resulting in message 635. For example, a translation between SOME/IP and a Proto Custom option translation is shown below in Table 1.

TABLE 1

| Proto Custom Option | SOME/IP | Description |
| --- | --- | --- |
| Service | Service ID | Upper 16 bits from the Message ID field |
| method:id | Method ID | Lower 16 bits of the Message ID |
| instance:id | Event ID | |

Another example, shown below in Table 2, is a translation between a cloud event, e.g., CloudEvents™ Attributes and SOME/IP attributes.

TABLE 2

| CloudEvents ™ Attribute | SOME/IP Attribute | Description |
| --- | --- | --- |
| id | Request ID | Truncate length |
| source | IP Address & Service ID | Source Attribute |
| type | Message Type | Type of CloudEvents ™ message |
| specversion | Protocol Version | Fixed to protocol version |
| sink | Destination IP Address | URI generated by hostname lookup of destination IP address |
| datacontenttype | N/A | |
| dataschema | Event ID (of Message ID) | Inferred from lower 15 bits of Message ID |

Another example, shown below in Table 3, is a translation between a URI Field and a SOME/IP attribute for a source.

TABLE 3

| URI Field | SOME/IP Attribute | Description |
| --- | --- | --- |
| device | <IP Address> | Use source IP address to map to a device name |
| service | Service ID | Service Identifier (integer) that represents the service and authority information of the uProtocol URI. 16 bits of the 32-bit Message ID. |
| version | Interface Version | Service major version |
| resource | Event ID | Represents unique topic identifier |

Another example, shown below in Table 4, is a translation between SOME/IP type messages.

TABLE 4

| Event | SOME/IP Event Type | SOME/IP Service ID | SOME/IP Type T Entry | SOME/IP TTL |
| --- | --- | --- | --- | --- |
| Generic | Notification | !0xFFFF | N/A | |
| Subscribe | SubscribeEventgroup | 0xFFFF | 0x6 | >0 |
| Unsubscribe | SubscribeEventgroup | 0xFFFF | 0x6 | 0 |
| Status | SubscribeEventgroup/Ack/Nack | 0xFFFF | 0x7 | |
| Discovery | FindService | 0xFFFF | 0x0 | |
| | OfferService | 0xFFFF | 0x1 | >0 |
| | StopServiceOffer | 0xFFFF | 0x1 | 0 |

Message 635 may then pass to run time environment 626. Run time environment 626, as described in FIG. 5, may act as a communications bridge, here bridging message 635 to message 637 that may be delivered to streamer 628. Streamer 628 may perform a protocol binding where the message 637 is integrated into an automotive/embedded communication protocol, for example SOME/IP, at protocol binding 639. The bound message is then returned to run time environment 626 as message 641 for serialization and sent as message 643 to streamer 612, for example as a cloud event over SOME/IP or MQTT.

Streamer 612 receives message 643 and at step 645 deserializes the cloud event header by stripping information such as the transport header. Streamer 612 then may build a cloud event object 647 using metadata from the message transport and payload and sent to the service bus 614 that may then de-serialize the cloud event object 647 using a deserializer such as protobuf and deliver the cloud event 649 to the application 616. Application 616 may then process the cloud event 649 at step 651 by unpacking the data and generating an appropriate action based on the event.

FIG. 7 is an illustration of a publishing event 700 from the system on chip (SoC) to the cloud according to an embodiment of the disclosure. Publishing event 700 includes a SoC 710 and a cloud native technology 720 in which cloud events may be sent to and from devices using cloud compliant protocols.

SoC 710 may include service 712, also referred to as a cloud service, which may provide a wide range of services delivered on demand to companies and customers over the internet. SoC 710 may also include a service bus 714 and a streamer 716. Service bus 714 may be a communications or messaging service on a cloud used to connect applications, devices, and services running in the cloud to other applications or services. In essence, service bus 714 acts as a communications and messaging backbone for applications available in the cloud or across devices. Cloud native technology 720 may include a streamer 722, a service bus 724, and a software application 726.

Publishing event 700 may include the following sequence. Service 712 generates a cloud event 731 wherein the metadata is populated and the payload data may be generic and is sent on to the service bus 714 where the cloud event 731 is serialized, for example using a protobuf serializer, as a cloud event message 733 and then sent to the streamer 716 may perform a protocol binding where the cloud event message 733 is integrated into an automotive/embedded communication protocol, for example SOME/IP, at protocol binding 735. The bound message is then serialized and sent as message 737 to streamer 722, for example as a cloud event over SOME/IP or MQTT.

Streamer 722 receives message 737 and at step 739 deserializes the cloud event header by stripping information such as the transport header. Streamer 722 then may build a cloud event object 741 using metadata from the message transport and payload and sent to the service bus 724 that may then de-serialize the cloud event object 741, also referred to as the payload or payload data, using a deserializer such as protobuf and deliver the cloud event 743 to the application 726. Application 726 may then process the cloud event 743 at step 745 and generate an appropriate action based on the event.

Figure 8:
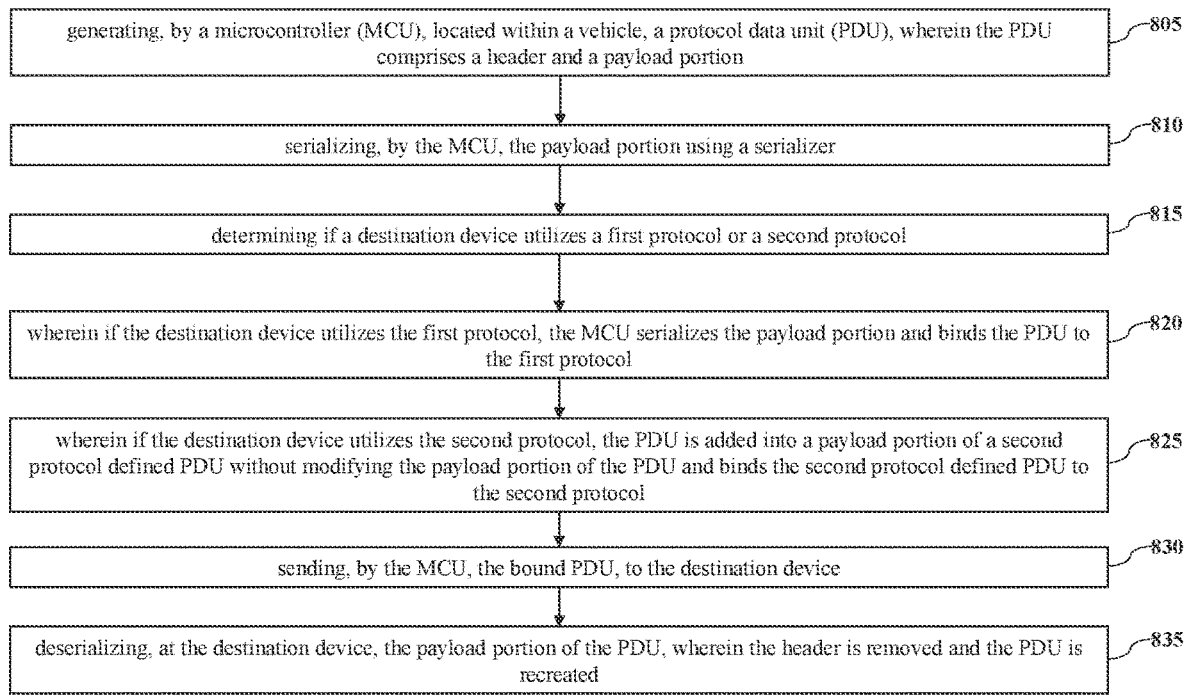
FIG. 8 depicts a flowchart of a method for optimizing device-to-device cloud communications using a first protocol and a second protocol, in accordance with the disclosure.

FIG. 8 shows an exemplary embodiment of a method for embedded in-vehicle device-to-device cloud communications optimization. Method 800 begins at step 805 with generating, by a MCU that is located within a vehicle, a cloud event includes a header and a payload portion. The cloud event may also be referred to as a protocol data unit (PDU). The cloud event may have been generated within the vehicle based on signals or other data from internal sensors or controls as discussed in FIG. 6. That cloud event may also have been processed by a software component providing translations and various abstractions generating event data that is destined for a cloud-based application.

At step 810 the payload portion of the PDU may be in a structured format and thus needs to be serialized so that it can be published and streamed to another device. Thus, at step 810 the payload portion of the PDU is serialized, for example by using a protobuf serializer. The serialization may be accomplished by the MCU, or in another embodiment could be a SoC or other cloud-based service. In an embodiment the serialization may be accomplished using a protobuf serializer.

Once serialized, at step 815 a determination may be made as to what type of transport protocol a destination device may be using. The destination device could be an MCU, a SoC, a cloud-based device or service, or some other type of electronic device. As discussed, a protocol employed by a device may be an automotive/embedded communication protocol, for example a protocol that is compliant with the AUTOSAR™ SOME/IP standard. Or, in the alternative the protocol may be a Cloud computing compliant design, for example MQTT or CloudEvents™ Thus, in an embodiment a first protocol may be compatible with the SOME/IP standard and the second protocol may be compatible with a Cloud computing standard. Hence, step 815 may include a determination that the destination device may be using a first protocol or a second protocol.

At step 820, given that a determination may be made that the destination device may be operating with the first protocol, then the MCU, for example MCU 520 or MCU 620, in a vehicle, may serialize the payload portion of the PDU. As discussed, the PDU may include a header and a payload portion, but serialization may be directed to just the payload portion of the PDU. Once the payload portion is serialized, the PDU may be bound to the first protocol. In an embodiment, the first protocol may be scalable service-oriented middleware over IP.

At step 825, given that a determination may be made that the destination device may be operating with the second protocol, then the PDU is simply added into the payload portion of a second protocol defined PDU. The original payload portion of the PDU does not need to be modified. The new second protocol PDU, with the added payload portion of the original PDU may then be bound to the second protocol. In an embodiment, the second protocol may be a cloud-based transport protocol.

At step 830 the bound PDU, using either the first protocol or the second protocol, may then be sent to the destination device. At step 835, at the destination device, which again may be another MCU, Soc, or Cloud-based service or device, may perform the deserializing or the payload portion of the PDU. This deserialization process may include removing the header and therefore recreate the original PDU. In an embodiment, the deserializing may be accomplished using a protobuf deserializer. In addition, the destination device may be located within the vehicle, or in another location.

Method 800 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A vehicular communication controller apparatus comprising:
   a microcontroller (MCU), located within a vehicle, configured to publish a newly defined protocol data unit (PDU) comprising a header and a payload portion, wherein the MCU is further configured to determine that a receiving device utilizes a first protocol or a second protocol, wherein the first protocol is based on Scalable service-Oriented MiddlewarE over IP and wherein the second protocol is cloud computing compliant;
   wherein the receiving device utilizes the first protocol and wherein the MCU serializes the payload portion of the PDU and binds the PDU to the first protocol;
   wherein the receiving device is configured to receive the PDU using the first protocol, deserialize the payload portion, and remove the header leaving the payload portion unchanged;
   wherein the receiving device is not a destination device for the PDU; and
   wherein the receiving device forwards the PDU to a second device using the second protocol leaving the PDU payload untouched.

2. The apparatus of claim 1, wherein the serializing the PDU into the payload portion of the PDU uses a protobuf serializer.

3. The apparatus of claim 1, the destination device is configured to forward the PDU to a second destination device utilizing the second protocol.

4. The apparatus of claim 1, wherein the deserializing the payload portion uses a protobuf deserializer.

5. The apparatus of claim 1, wherein the destination device is located within the vehicle.

6. The apparatus of claim 1, wherein the destination device utilizes the second protocol, the PDU is bound to a second protocol defined PDU without modifying the payload portion of the PDU.

7. A vehicular communication controller apparatus comprising:
   a microcontroller (MCU), located within a vehicle, configured to receive a protocol data unit (PDU) published by a source device, the PDU comprising a header and a payload portion, the MCU further configured to determine that the received PDU utilizes a first protocol or a second protocol, wherein the first protocol is based on Scalable service-Oriented MiddlewarE over IP and wherein the second protocol is cloud computing compliant;
   wherein the MCU is further configured to determine that a received PDU utilizes the first protocol;
   wherein the MCU is further configured to receive the PDU using the first protocol, deserialize the payload portion, and remove the header, leaving the payload portion unchanged; and
   wherein the MCU is further configured to recreate, based on the payload portion, the PDU.

8. The vehicular communication controller of claim 7, wherein the deserializing the payload portion uses a protobuf deserializer.

9. The vehicular communication controller of claim 7, wherein the source device is located within the vehicle.

10. The vehicular communication controller of claim 7, further comprising a destination device, wherein the MCU is further configured to forward the PDU to the destination device utilizing the second protocol.

11. The vehicular communication controller of claim 7, wherein the MCU is communicatively coupled through a Message Queuing Telemetry Transport (MQTT).

12. The vehicular communication controller of claim 7, wherein the MCU utilizes the second protocol, the PDU is bound to a second protocol defined PDU without modifying the payload portion of the PDU.

13. A method comprising:
   generating, by a microcontroller (MCU), located within a vehicle, a protocol data unit (PDU), wherein the PDU comprises a header and a payload portion;
   serializing, by the MCU, the payload portion using a serializer;
   determining if a destination device utilizes a first protocol or a second protocol, wherein the first protocol is based on Scalable service-Oriented MiddlewarE over IP and wherein the second protocol is cloud computing compliant;
   wherein if the destination device utilizes the first protocol, the MCU serializes the payload portion and binds the PDU to the first protocol, and
   wherein if the destination device utilizes the second protocol, the PDU is added into a payload portion of a second protocol defined PDU without modifying the payload portion of the PDU and binds the second protocol defined PDU to the second protocol;
   sending, by the MCU, the bound PDU, to the destination device; and
   deserializing, at the destination device, the payload portion of the PDU, wherein the header is removed and the PDU is recreated.

14. The method of claim 13, wherein the serializing the payload portion uses a protobuf serializer.

15. The method of claim 13, wherein the deserializing the payload portion uses a protobuf deserializer.

16. The method of claim 13, wherein the second protocol comprises a Message Queuing Telemetry Transport (MQTT).

17. The method of claim 13, wherein the destination device is located within the vehicle.

\* \* \* \* \*